United States Patent
Yukimasa et al.

(10) Patent No.: US 10,938,042 B2
(45) Date of Patent: Mar. 2, 2021

(54) FUEL CELL SYSTEM

(71) Applicant: Panasonic Intellectual Property Management Co., Ltd., Osaka (JP)

(72) Inventors: Akinori Yukimasa, Nara (JP); Yoshito Usuki, Osaka (JP); Miki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 15/828,579

(22) Filed: Dec. 1, 2017

(65) Prior Publication Data

US 2018/0175409 A1    Jun. 21, 2018

(30) Foreign Application Priority Data

Dec. 15, 2016   (JP) ............................. JP2016-243464

(51) Int. Cl.
*H01M 8/04089*    (2016.01)
*H01M 8/04228*    (2016.01)
(Continued)

(52) U.S. Cl.
CPC ...... *H01M 8/04097* (2013.01); *G05D 7/0682* (2013.01); *H01M 8/04029* (2013.01);
(Continued)

(58) Field of Classification Search
None
See application file for complete search history.

(56) References Cited

U.S. PATENT DOCUMENTS

2004/0229088 A1* 11/2004 Hayashi ............ H01M 8/04231
                                                                 429/429
2005/0074641 A1*  4/2005 Inai ................... H01M 8/04231
                                                                 429/429
(Continued)

FOREIGN PATENT DOCUMENTS

JP    2004-179100 A      6/2004
JP    2005093231 A   *   4/2005
WO    2009/113304        9/2009

OTHER PUBLICATIONS

The Extended European Search Report dated May 15, 2018 for the related European Patent Application No. 17206326.5.

*Primary Examiner* — Tracy M Dove
(74) *Attorney, Agent, or Firm* — McDermott Will and Emery LLP

(57) ABSTRACT

A fuel cell system includes: a fuel cell including an anode gas flow channel and a cathode gas flow channel and generating electricity from a hydrogen-containing anode gas of the anode gas flow channel and an oxygen-containing cathode gas of the cathode gas flow channel; an anode off-gas emission path through which an anode off-gas emitted from the anode gas flow channel flows; and a cathode off-gas emission path through which a cathode off-gas emitted from the cathode gas flow channel flows. After stoppage of generation of electricity by the fuel cell, gas purging is performed in which at least a part of the cathode off-gas emission path is purged with a hydrogen-containing gas having passed through a junction where the anode off-gas emission path and the cathode off-gas emission path meet each other. The hydrogen-containing gas contains at least either the anode gas or the anode off-gas.

8 Claims, 8 Drawing Sheets

(51) Int. Cl.

| | |
|---|---|
| *H01M 8/04303* | (2016.01) |
| *H01M 8/04223* | (2016.01) |
| *H01M 8/0432* | (2016.01) |
| *H01M 8/0438* | (2016.01) |
| *H01M 8/04955* | (2016.01) |
| *H01M 8/04746* | (2016.01) |
| *G05D 7/06* | (2006.01) |
| *H01M 8/04029* | (2016.01) |
| *H01M 8/1018* | (2016.01) |

(52) U.S. Cl.
CPC ....... *H01M 8/0435* (2013.01); *H01M 8/0441* (2013.01); *H01M 8/04104* (2013.01); *H01M 8/04228* (2016.02); *H01M 8/04231* (2013.01); *H01M 8/04303* (2016.02); *H01M 8/04335* (2013.01); *H01M 8/04358* (2013.01); *H01M 8/04395* (2013.01); *H01M 8/04761* (2013.01); *H01M 8/04955* (2013.01); *H01M 2008/1095* (2013.01)

(56) References Cited

U.S. PATENT DOCUMENTS

2005/0196654 A1\* 9/2005 Inai .................. H01M 8/04126
  429/413
2010/0136445 A1   6/2010 Morita et al.

\* cited by examiner

FUEL CELL SYSTEM

BACKGROUND

1. Technical Field

The present disclosure relates to a fuel cell system.

2. Description of the Related Art

In a polymer electrolyte fuel cell (hereinafter referred to as "PEFC"), when the outside air (oxygen) flows into a cathode gas flow channel after the operation of the fuels cell is stopped, the air causes the electric potential of a cathode electrode to increase, deterioration of a catalyst and/or decreases the cell performance.

To address this problem, Japanese Patent No. 4599461 proposes appropriately setting the volume of a cathode off-gas sealing space in which oxygen is lower in concentration than outside air that flows into a PEFC, with attention focused on the fact that the concentration of oxygen in a cathode off-gas that is emitted from the PEFC (off-air emitted from the PEFC) lowers during generation of electricity. Specifically, Japanese Patent No. 4599461 describes making the volume of the space one or more times larger than that of a cathode gas flow channel of the fuel cell. This reduces the occurrence of the foregoing problem by turning, into a cathode off-gas, most of the gas that flows into the cathode gas flow channel in the PEFC after stoppage of generation of electricity by the PEFC.

However, the conventional example fails to discuss inconvenience caused by setting the volume of the cathode off-gas sealing space at a desired value.

SUMMARY

One non-limiting and exemplary embodiment provides a fuel cell system that makes it possible, even without changing the volume of a cathode off-gas sealing space, to reduce the amount of outside oxygen that flows into a fuel cell after stoppage of generation of electricity by the fuel cell.

In one general aspect, the techniques disclosed here feature a fuel cell system including: a fuel cell including an anode gas flow channel and a cathode gas flow channel, the fuel cell generating electricity from a hydrogen-containing anode gas of the anode gas flow channel and an oxygen-containing cathode gas of the cathode gas flow channel; an anode off-gas emission path through which an anode off-gas emitted from the anode gas flow channel of the fuel cell flows; and a cathode off-gas emission path through which a cathode off-gas emitted from the cathode gas flow channel of the fuel cell flows, wherein after stoppage of generation of electricity by the fuel cell, gas purging is performed in which at least a part of the cathode off-gas emission path is purged with a hydrogen-containing gas having passed through a junction where the anode off-gas emission path and the cathode off-gas emission path meet each other, and the hydrogen-containing gas contains at least either the anode gas or the anode off-gas.

A fuel cell system according to an aspect of the present disclosure brings about an effect of making it possible, even without changing the volume of a cathode off-gas sealing space, to reduce the amount of outside oxygen that flows into a fuel cell after stoppage of generation of electricity by the fuel cell.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
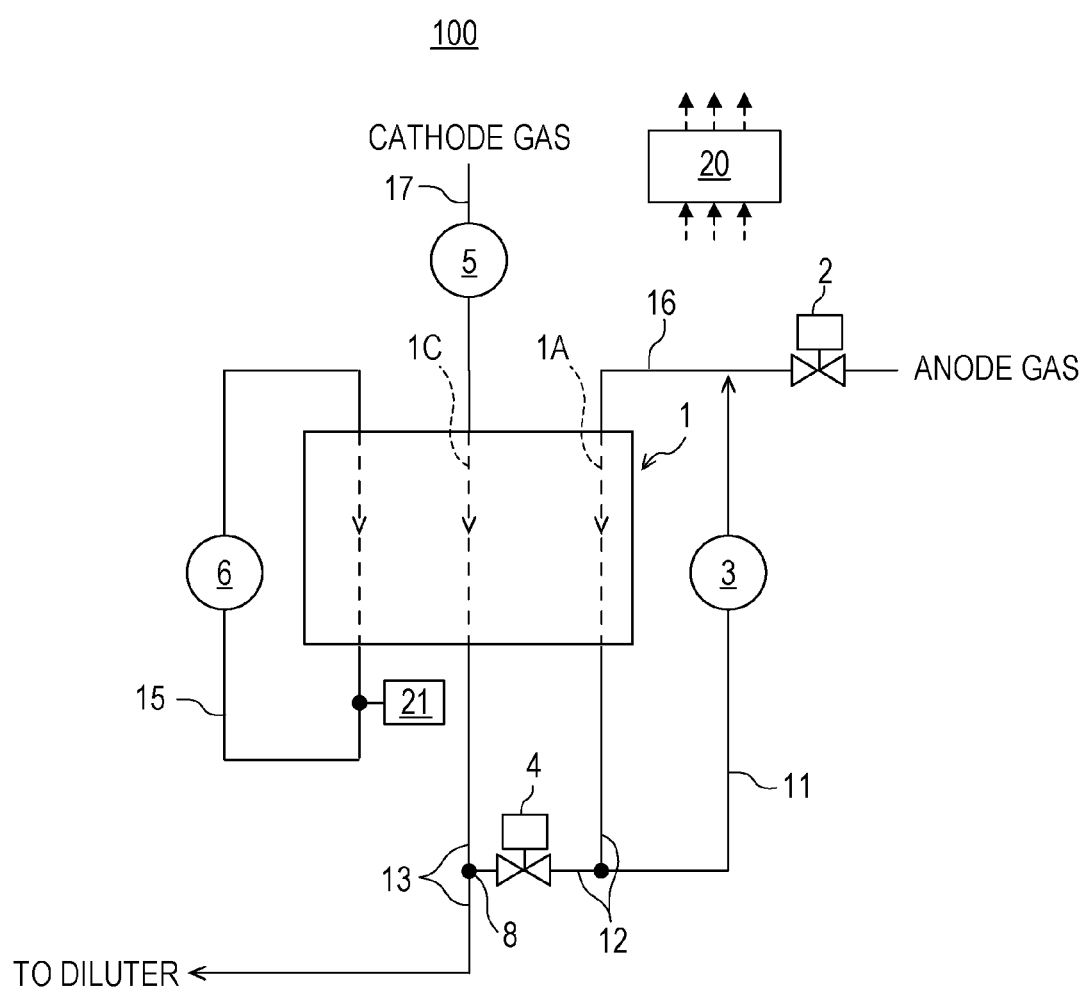
FIG. 1 is a diagram showing an example of a fuel cell system according to an embodiment.

The following findings were obtained by diligently studying the inconvenience caused by setting the volume of the cathode off-gas sealing space at the desired value.

Making the volume of the cathode off-gas sealing space, for example, one or more times larger than that of the cathode gas flow channel of the fuel cell according to the disclosures in Japanese Patent No. 4599461 may enlarge the size of a pipe that constitutes the cathode off-gas sealing space, depending on how the fuel cell system is configured. This may impose structural restrictions on the fuel cell system and make it impossible to accommodate miniaturization or the like of the fuel cell system.

To address this problem, the inventors have arrived at the idea of purging a cathode off-gas emission path with a hydrogen-containing gas at an appropriate time after stoppage of generation of electricity by the fuel cell.

That is, a fuel cell system according to a first aspect of the present disclosure includes an anode gas flow channel and a cathode gas flow channel, the fuel cell generating electricity from a hydrogen-containing anode gas of the anode gas flow channel and an oxygen-containing cathode gas of the cathode gas flow channel; an anode off-gas emission path through which an anode off-gas emitted from the anode gas flow channel of the fuel cell flows; and a cathode off-gas emission path through which a cathode off-gas emitted from the cathode gas flow channel of the fuel cell flows. After stoppage of generation of electricity by the fuel cell, gas purging is performed in which at least a part of the cathode off-gas emission path is purged with a hydrogen-containing gas having passed through a junction where the anode off-gas emission path and the cathode off-gas emission path meet each other. The hydrogen-containing gas contains at least either the anode gas or the anode off-gas.

This configuration makes it possible, even without changing the volume of the cathode off-gas sealing space, to reduce the amount of outside oxygen that flows into the fuel cell after stoppage of generation of electricity by the fuel cell. That is, since at least a part of the cathode off-gas emission path is purged with the hydrogen-containing gas at an appropriate timing after stoppage of generation of electricity by the fuel cell, an increase in the amount of oxygen in the gas in the cathode gas flow channel in the fuel cell can be appropriately suppressed even if outside air flows into the cathode off-gas emission path of the fuel cell. Further, the elimination of the need to change the volume of the cathode off-gas sealing space makes it unnecessary to enlarge the size of a pipe that constitutes the sealing space. This makes it possible to appropriately accommodate miniaturization or the like of the fuel cell system.

Further, a fuel cell system according to a second aspect of the present disclosure is the fuel cell system according to the first aspect of the present disclosure, further including: a purge valve provided in the anode off-gas emission path; an anode gas supply path through which the anode gas that is supplied to the anode gas flow channel flows; an anode gas supplier provided in the anode gas supply path; and a controller that controls the anode gas supplier and the purge valve during the gas purging.

This configuration makes it possible to perform the gas purging by opening the purge valve and appropriately controlling the anode gas supplier.

Further, a fuel cell system according to a third aspect of the present disclosure is the fuel cell system according to the second aspect of the present disclosure, further including: a recycle gas path that branches off from the anode off-gas emission path upstream of the purge valve and meets the anode gas supply path; and a booster provided in the recycle gas path, wherein the controller activates the booster during the gas purging.

This configuration makes it possible to generate electricity with high efficiency by configuring the anode off-gas to return to the anode gas flow channel of the fuel cell. Further, activating the booster allows the anode off-gas of the recycle gas path and the anode gas of the anode gas supply path to be smoothly supplied to the anode off-gas emission path during the gas purging.

Further, a fuel cell system according to a fourth aspect of the present disclosure is the fuel cell system according to any of the first to third aspects of the present disclosure, further including a first temperature detector that detects a temperature of the fuel cell, wherein the gas purging is performed on the basis of an amount of change in detected data of the first temperature detector.

According to this configuration, since it is possible to predict an amount of shrinkage of the gas in the cathode off-gas emission path on the basis of the amount of change in the detected data of the first temperature detector, the amount of outside air that flows into the cathode off-gas emission path can be appropriately estimated from the amount of shrinkage. This makes it possible to perform the gas purging at an appropriate time when the amount of outside air that flows into the cathode off-gas emission path has reached a predetermined level, thus making it possible to send the hydrogen-containing gas in an appropriate amount corresponding to the amount of outside air that flows into the cathode off-gas emission path. Further, the size of a pipe that constitutes the cathode off-gas emission path can be appropriately designed in accordance with the amount of outside air that flows into the cathode off-gas emission path.

An embodiment of the present disclosure, first and second modifications of the embodiment, and first to third examples of the embodiment are described below with reference to the accompanying drawings.

The embodiment of the present disclosure, the first and second modifications of the embodiment, and the first to third examples of the embodiment, which are described below, show examples of the aspects described above. Accordingly, the shapes, the materials, the constituent elements, and the placement and connection of the constituent elements, the steps of the operations, and the orders of the steps are mere examples and not intended to limit the aspects described above, unless they are recited in the claims. Further, those of the constituent elements described below which are not recited in an independent claim representing the most generic concept of the present aspect are described as optional constituent elements. Further, the constituent elements given the same reference numerals throughout the drawings may not be redundantly described. For ease of comprehension, the drawings schematically show the constituent elements and, as such, may not be accurate representations of their shapes or dimensional ratios. Further, the operations are subject to change in the order of the steps on an as-needed basis. Further, another publicly-known step may be added on an as-needed basis.

EMBODIMENT

FIG. 1 is a diagram showing an example of a fuel cell system according to an embodiment.

In the example shown in FIG. 1, a fuel cell system 100 includes a fuel cell 1, an anode gas supplier 2, a booster 3, a purge valve 4, a cathode gas supplier 5, a cooling water circulator 6, a recycle gas path 11, an anode off-gas emission path 12, a cathode off-gas emission path 13, a cooling water circulatory path 15, an anode gas supply path 16, a cathode gas supply path 17, a controller 20, and a first temperature detector 21.

The fuel cell 1 includes an anode gas flow channel 1A and a cathode gas flow channel 10. The fuel cell 1 generates electricity from a hydrogen-containing anode gas of the anode gas flow channel 1A and an oxygen-containing cathode gas of the cathode gas flow channel 10. That is, the fuel cell 1 generates electricity through the binding of oxygen contained in a cathode gas supplied to the cathode gas flow channel 10 on the positive-electrode side and hydrogen contained in an anode gas supplied to the anode gas flow channel 1A on the negative-electrode side. The fuel cell 1 may be of any kind. Possible examples of the fuel cell 1 include a polymer electrolyte fuel cell (hereinafter referred to as "PEFC"), a solid oxide fuel cell, a phosphoric acid fuel cell, and the like.

The anode gas supply path 16 is a flow channel through which the anode gas that is supplied to the anode gas flow channel 1A of the fuel cell 1 flows. The anode gas supplier 2 is provided in the anode gas supply path 16.

The anode gas supplier 2 is a piece of equipment that controls the flow rate of the anode gas that is sent to the anode gas flow channel 1A. Possible examples of the anode gas supplier 2 include a booster, a flow control valve, and the like. Possible examples of the booster include a booster pump and the like. Possible examples of the flow control valve include a needle valve, a governor, and the like. Possible examples of the anode gas include a hydrogen gas, a reformed gas, and the like.

In the fuel cell system 100 according to the present embodiment, the hydrogen gas, which is an example of the anode gas, is supplied from a hydrogen gas supply source (not illustrated) directly to the anode gas flow channel 1A of the fuel cell 1. The hydrogen gas supply source includes a predetermined supply pressure. Possible examples of the hydrogen gas supply source include a hydrogen gas infrastructure, a hydrogen gas cylinder, and the like. Therefore, in the fuel cell system 100 according to the present embodiment, a hydrogen gas flow control valve is used as the anode gas supplier 2.

Accordingly, the configuration and operation of the fuel cell system 100 are described below on the assumption that the anode gas supplier 2 is an anode gas supply valve 2 as shown in FIG. 1.

It should be noted that, although not illustrated in FIG. 1, a piece of equipment that is needed for the generation of electricity by the fuel cell 1 is provided as appropriate. For example, when the fuel cell 1 is a PEFC, a humidifier that humidifies the hydrogen gas flowing through the anode gas supply path 16 or the like may be provided.

The cathode gas supply path 17 is a flow channel through which the cathode gas that is supplied to the cathode gas flow channel 10 of the fuel cell 1 flows. The cathode gas supplier 5 is provided in the cathode gas supply path 17.

The cathode gas supplier 5 is a piece of equipment that controls the flow rate of the cathode gas that is sent to the cathode gas flow channel 10. In the fuel cell system 100 according to the present embodiment, air is used as the cathode gas. In this case, possible examples of the cathode gas supplier 5 include a blower and a fan such as a sirocco fan.

The anode off-gas emission path 12 is a flow channel through which an anode off-gas emitted from the anode gas flow channel 1A of the fuel cell 1 flows. That is, an off-hydrogen gas (anode off-gas) that was not used for the generation of electricity by the fuel cell 1 is released into the anode off-gas emission path 12.

The cathode off-gas emission path 13 is a flow channel through which a cathode off-gas emitted from the cathode gas flow channel 10 of the fuel cell 1 flows. That is, off-air (cathode off-gas) that was not used for the generation of electricity by the fuel cell 1 is released into the cathode off-gas emission path 13.

The purge valve 4 is provided in the anode off-gas emission path 12. Usable examples of the purge valve 4 include an electromagnetic on-off valve and the like.

Note here that, in the fuel cell system 100 according to the present embodiment, the anode off-gas emission path 12 and the cathode off-gas emission path 13 meet each other. Further, the recycle gas path 11 branches off from the anode off-gas emission path 12 upstream of the purge valve 4 and meets the anode gas supply path 16. That is, the recycle gas path 11 has its upstream end connected to the anode off-gas emission path 12 and its downstream end connected to the anode gas supply path 16. The downstream end of the recycle gas path 11 may be connected to any place on a flow channel through which the anode gas flows. For example, as shown in FIG. 1, the downstream end of the recycle gas path 11 may be connected to the anode gas supply path 16 between the fuel cell 1 and the anode gas supply valve 2 or may be connected to the anode gas supply path 16 upstream of the anode gas supply valve 2.

The booster 3 is provided in the recycle gas path 11. The booster 3 is a piece of equipment for pumping, to the anode gas supply path 16, the anode off-gas that flows through the recycle gas path 11. Usable examples of the booster 3 include a rotating pump, a reciprocating pump, and the like.

The first temperature detector 21 detects the temperature of the fuel cell 1. The first temperature detector 21 may be of any configuration, provided it can directly or indirectly detect the temperature of the fuel cell 1. For example, a temperature detector may be provided in the fuel cell 1 to directly detect the temperature of the fuel cell 1. Possible examples of the first temperature detector 21 include a thermocouple, a thermistor, and the like.

In the fuel cell system 100 according to the present embodiment, as shown in FIG. 1, the first temperature detector 21 is provided in the cooling water circulatory path 15, through which a cooling water that correlates with the temperature of the fuel cell 1 flows, to indirectly detect the temperature of the fuel cell 1. Specifically, the fuel cell 1 generates heat by generating electricity. For this reason, in a case where the fuel cell 1 is for example a PEFC, the fuel cell system 100, as shown in FIG. 1, includes the cooling water circulatory path 15 as a cooling mechanism for radiating the heat generated by the fuel cell 1. Moreover, the cooling water circulatory path 15 is provided with a cooling water circulator 6 that allows the cooling water to circulate through the cooling water circulatory path 15, the first temperature detector 21, which detects the temperature of the cooling water, a radiator (not illustrated) that externally radiates heat collected from the fuel cell 1 by the cooling water, and the like. This allows the temperature of the fuel cell 1 to be indirectly detected by the first temperature detector 21.

After stoppage of generation of electricity by the fuel cell 1, the controller 20 controls the anode gas supply valve 2 and the purge valve 4 during gas purging in which at least a part of the cathode off-gas emission path 13 is purged with a hydrogen-containing gas having passed through a junction 8 where the anode off-gas emission path 12 and the cathode off-gas emission path 13 meet each other. Specifically, the controller 20 opens the purge valve 4 and the anode gas supply valve 2 during the gas purging.

It should be noted that the hydrogen-containing gas contains at least either the anode gas or the anode-off gas. That is, immediately after the start of the first gas purging after stoppage of generation of electricity by the fuel cell 1, the anode off-gas that stays in the anode off-gas emission path 12 is sent as the hydrogen-containing gas to the cathode off-gas emission path 13, and after that, the anode gas is sent as the hydrogen-containing gas to the cathode off-gas emission path 13.

Further, the controller 20 may activate the booster 3 in executing the gas purging. Activating the booster 3 allows the anode off-gas of the recycle gas path 11 and the anode gas of the anode gas supply path 16 to be smoothly supplied to the anode off-gas emission path 12 during the gas purging.

Further, the controller 20 may control targets of control such as the anode gas supply valve 2 and the purge valve 4 on the basis of an amount of change in detected data of the first temperature detector 21 in executing the gas purging.

The controller 20 may be of any configuration, provided it has a control function. The controller 20 includes, for example, an arithmetic circuit (not illustrated) and a storage circuit (not illustrated) storing a control program. Possible examples of the arithmetic circuit include an MPU, a CPU, and the like. Possible examples of the storage circuit include a memory and the like. The controller 20 may be constituted by a single controller that performs centralized control or may be constituted by a plurality of controllers that perform decentralized control in cooperation with each other. Further, the controller 20 may be configured to control the working of the fuel cell system 100. In this case, the cathode gas supplier 5, the anode gas supply valve 2, the booster 3, and the cooling water circulator 6, and the like are controlled by the controller 20 on the basis of information such as the temperature of the fuel cell 1 and the amount of electricity that is generated by the fuel cell 1. Then, the flow rate of the anode gas, the flow rate of the cathode gas, the flow rate of the anode off-gas, and the flow rate of the cooling water are adjusted by the controller 20, so that the fuel cell system 100 works properly.

Operation

An example of operation of the fuel cell system 100 according to the present embodiment is described below with reference to the drawings.

It should be noted that the operation described below is performed by the arithmetic circuit of the controller 20 reading out the control program from the storage circuit. Note, however, that it is not essential that the controller 20 performs all of the operations described below. An operator may perform part of the operations described below.

First, the operation of the fuel cell system 100 during generation of electricity by the fuel cell 1 is described.

During generation of electricity by the fuel cell 1, normally, the purge valve 4 is closed and the booster 3 is activated. This causes the anode off-gas that was not used for the generation of electricity by the fuel cell 1 to be returned to the anode gas supply path 16 through the recycle gas path 11. Then, the anode off-gas can be used for the generation of electricity by the fuel cell 1, so that the fuel cell system 100 has higher electricity generation efficiency than in a case where it does not include such a recycle gas path 11.

Further, the operation of the cooling water circulator 6 allows the cooling water, which cools the fuel cell 1, to circulate. At this point in time, the operation of the cooling water circulator 6 is controlled on the basis of the detected data of the first temperature detector 21 so that the temperature of the fuel cell 1 becomes a temperature suited to the generation of electricity by the fuel cell 1.

Note here that the anode off-gas circulates in such a way as to return from an outlet of the anode gas flow channel 1A of the fuel cell 1 to an inlet of the anode gas flow channel 1 until it is used for the generation of electricity by the fuel cell 1. Then, while the anode off-gas is circulating through such an anode off-gas circulatory path, an impurity gas other than the hydrogen gas increases over time in the anode off-gas. Possible examples of the impurity gas include a nitrogen gas that leaks from the cathode of the PEFC to the anode through an electrolyte membrane. Since an increase in the impurity gas leads to a reduction in the concentration of hydrogen in the anode off-gas, the impurity gas is released from the anode off-gas circulatory path by temporarily opening the purge valve 4 at an appropriate time during the generation of electricity by the fuel cell 1. This makes it possible to reduce the concentration of the impurity gas in the anode off-gas, allowing a recovery of the concentration of hydrogen in the anode off-gas.

It should be noted that the anode off-gas containing the impurity gas that was released out of the anode off-gas circulatory path is supplied to a diluter (not illustrated in FIG. 1) through the cathode off-gas emission path 13. This makes it possible to appropriately reduce the concentration of hydrogen in the anode off-gas before releasing the anode off-gas into the atmosphere. A specific example of the diluter will be described in the third example.

Next, the operation of the fuel cell system 100 after stoppage of generation of electricity by the fuel cell 1 is described.

Figure 2:
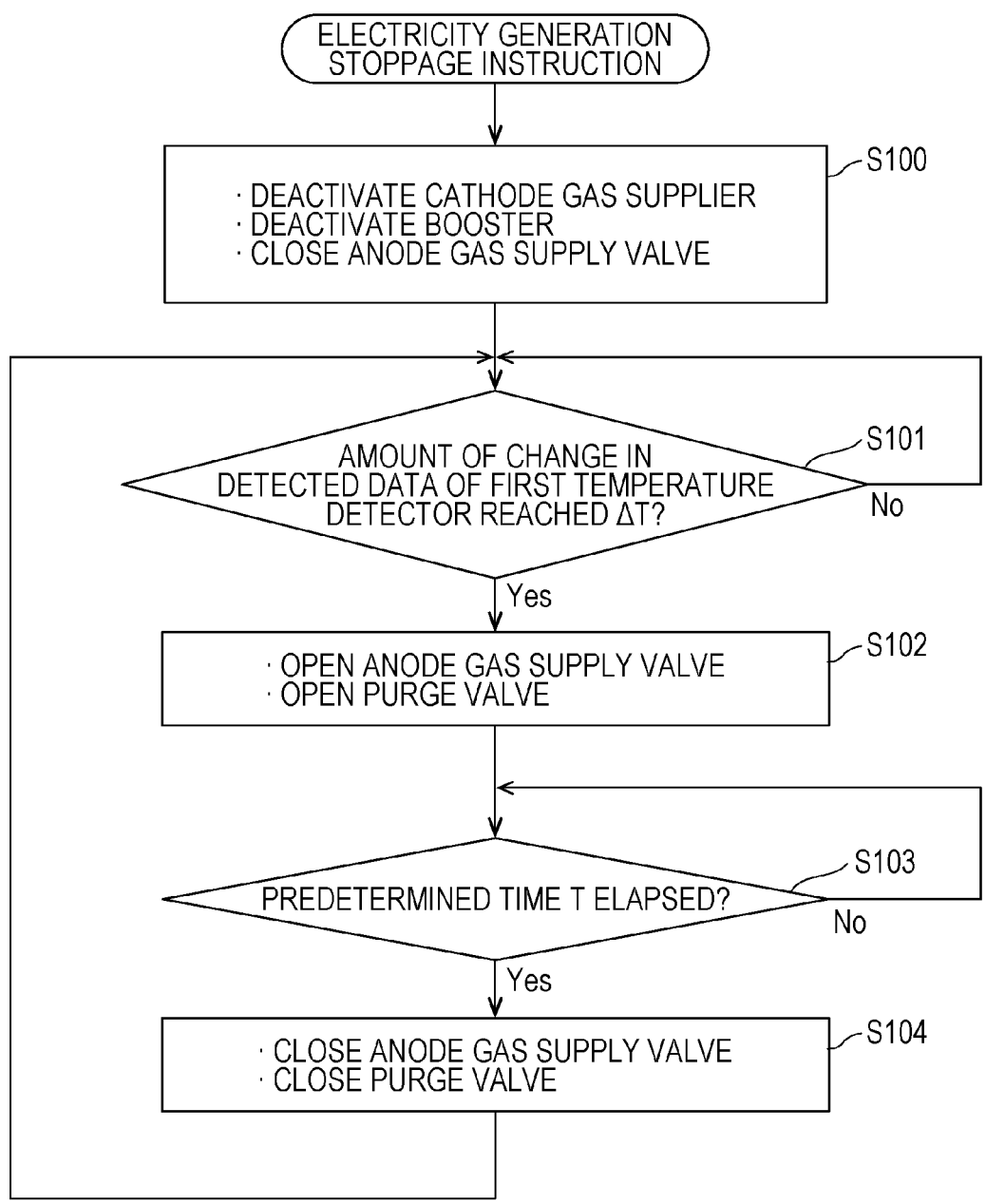
FIG. 2 is a flow chart showing an example of operation (working) of the fuel cell system according to the embodiment.

FIG. 2 is a flow chart showing an example of operation (working) of the fuel cell system according to the embodiment.

Upon receiving an electricity generation stoppage instruction in accordance with an operational status signal of the fuel cell system 100 to the controller 20 or a signal from an outside source (not illustrated), the fuel cell system 100 performs the following stoppage operation.

First, in step S100, the cathode gas supplier 5 and the booster 3 are deactivated and the anode gas supply valve 2 is closed. This stops the supply of the cathode gas to the cathode gas flow channel 10 of the fuel cell 1 and the supply of the anode gas to the anode gas flow channel 1A of the fuel cell 1. At this point in time, the cooling of the fuel cell 1 by the cooling water in the cooling water circulatory path 15 continues, as the cooling water circulator 6 is operating. This allows the temperature of the fuel cell 1 to be detected by the first temperature detector 21.

Next, in step S101, a determination is made as to whether the amount of change in the detected data of the first temperature detector 21 has reached a predetermined value ΔT.

In a case where the amount of change in the detected data of the first temperature detector 21 has not reached the predetermined value ΔT (i.e. in the case of "No" in step S101), the status quo is maintained.

In a case where the amount of change in the detected data of the first temperature detector 21 has reached the predetermined value ΔT (i.e. in the case of "Yes" in step S101), the process proceed to next step S102, in which the anode gas supply valve 2 and the purge valve 4 are opened. This causes a part of the cathode off-gas emission path 13 located downstream of the junction 8, where the anode off-gas emission path 12 and the cathode off-gas emission path 13 meet each other, to be purged with the hydrogen-containing gas having passed through the junction 8. Specifically, immediately after the start of the first gas purging after stoppage of generation of electricity by the fuel cell 1, the anode off-gas that stays in the anode off-gas emission path 12 is sent as the hydrogen-containing gas to the cathode off-gas emission path 13, and after that, the anode gas is sent as the hydrogen-containing gas to the cathode off-gas emission path 13.

In this way, the gas purging, in which at least a part of the cathode off-gas emission path 13 is purged, is performed on the basis of the amount of change in the detected data of the first temperature detector 21.

It should be noted that the booster 3 may be activated in step S102. Activating the booster 3 allows the anode off-gas of the recycle gas path 11 and the anode gas of the anode gas supply path 16 to be smoothly supplied to the anode off-gas emission path 12 during the gas purging.

Next, in step S103, a determination is made as to whether the gas purging of step S102 has continued for a predetermined time T.

In a case where the gas purging of step S102 has not continued for the predetermined time T (i.e. in the case of "No" in step S103), the status quo is maintained.

In a case where the gas purging of step S102 has continued for the predetermined time T (i.e. in the case of "Yes" in step S103), the process proceeds to next step S104, in which the anode gas supply valve 2 and the purge valve 4 are closed. It should be noted that in a case where the booster 3 was activated in step S102, the booster 3 is deactivated in step S104.

After that, the amount of change in the detected data of the first temperature detector 21 is initialized, and the operation from step S101 onward is performed again.

Thus, the fuel cell system 100 according to the present embodiment makes it possible, even without changing the volume of the cathode off-gas sealing space, to reduce the amount of outside oxygen that flows into the fuel cell 1 after stoppage of generation of electricity by the fuel cell 1. That is, since at least a part of the cathode off-gas emission path 13 is purged with the hydrogen-containing gas at an appropriate timing after stoppage of generation of electricity by the fuel cell 1, an increase in the amount of oxygen in the gas in the cathode gas flow channel 10 of the fuel cell 1 can be appropriately suppressed even if outside air flows into the cathode off-gas emission path 13 of the fuel cell 1. Further, the elimination of the need to change the volume of the cathode off-gas sealing space makes it unnecessary to enlarge the size of a pipe that constitutes the sealing space. This makes it possible to appropriately accommodate miniaturization or the like of the fuel cell system 100.

Further, since it is possible to predict an amount of shrinkage of the gas in the cathode off-gas emission path 13 on the basis of the amount of change in the detected data of the first temperature detector 21, the amount of outside air that flows into the cathode off-gas emission path 13 can be appropriately estimated from the amount of shrinkage.

This makes it possible to perform the gas purging at an appropriate time when the amount of outside air that flows into the cathode off-gas emission path 13 has reached a predetermined level, thus making it possible to send the hydrogen-containing gas in an appropriate amount corresponding to the amount of outside air that flows into the cathode off-gas emission path 13. Further, the size of a pipe that constitutes the cathode off-gas emission path 13 can be appropriately designed in accordance with the amount of outside air that flows into the cathode off-gas emission path 13.

First Modification

A fuel cell system 100 according to the present modification is the fuel cell system 100 according to any of the first to third aspects, further including a second temperature detector 22 that detects a gas temperature of at least either the cathode gas flow channel 10 or the cathode off-gas emission path 13 of the fuel cell 1, wherein the gas purging is performed on the basis of an amount of change in detected data of the second temperature detector 22.

Figure 3:
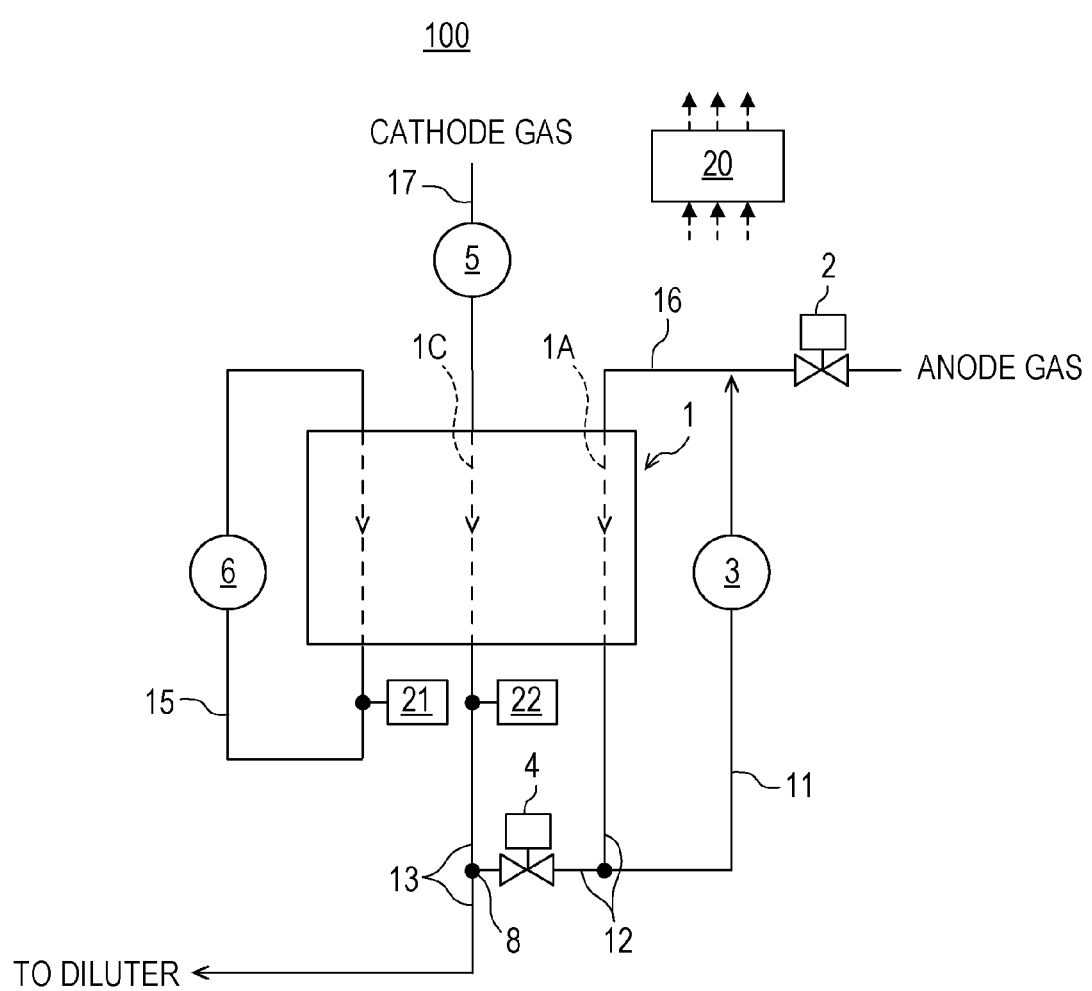
FIG. 3 is a diagram showing an example of a fuel cell system according to a first modification of the embodiment.

FIG. 3 is a diagram showing an example of a fuel cell system according to a first modification of the embodiment.

In the example shown in FIG. 3, the fuel cell system 100 includes a fuel cell 1, an anode gas supply valve 2, a booster 3, a purge valve 4, a cathode gas supplier 5, a cooling water circulator 6, a recycle gas path 11, an anode off-gas emission path 12, a cathode off-gas emission path 13, a cooling water circulatory path 15, an anode gas supply path 16, a cathode gas supply path 17, a controller 20, a first temperature detector 21, and a second temperature detector 22.

The fuel cell 1, the anode gas supply valve 2, the booster 3, the purge valve 4, the cathode gas supplier 5, the cooling water circulator 6, the recycle gas path 11, the anode off-gas emission path 12, the cathode off-gas emission path 13, the cooling water circulatory path 15, the anode gas supply path 16, the cathode gas supply path 17, and the first temperature detector 21 are the same as those of the embodiment and, as such, are not described here.

As mentioned above, the second temperature detector 22 detects the gas temperature of at least either the cathode gas flow channel 10 or the cathode off-gas emission path 13 of the fuel cell 1. The second temperature detector 22 may be of any configuration, provided it can directly or indirectly detect such a gas temperature. In the fuel cell system 100 according to the present modification, the second temperature detector 22 is disposed on the cathode off-gas emission path 13 near the outlet of the cathode gas flow channel 10 of the fuel cell 1. This allows the gas temperature of the cathode off-gas emission path 13 of the fuel cell 1 to be directly detected by the second temperature detector 22. Possible examples of the second temperature detector 22 include a thermocouple, a thermistor, and the like.

The controller 20 may control targets of control such as the anode gas supply valve 2 and the purge valve 4 on the basis of the amount of change in the detected data of the second temperature detector 22 in executing the gas purging.

Figure 4:
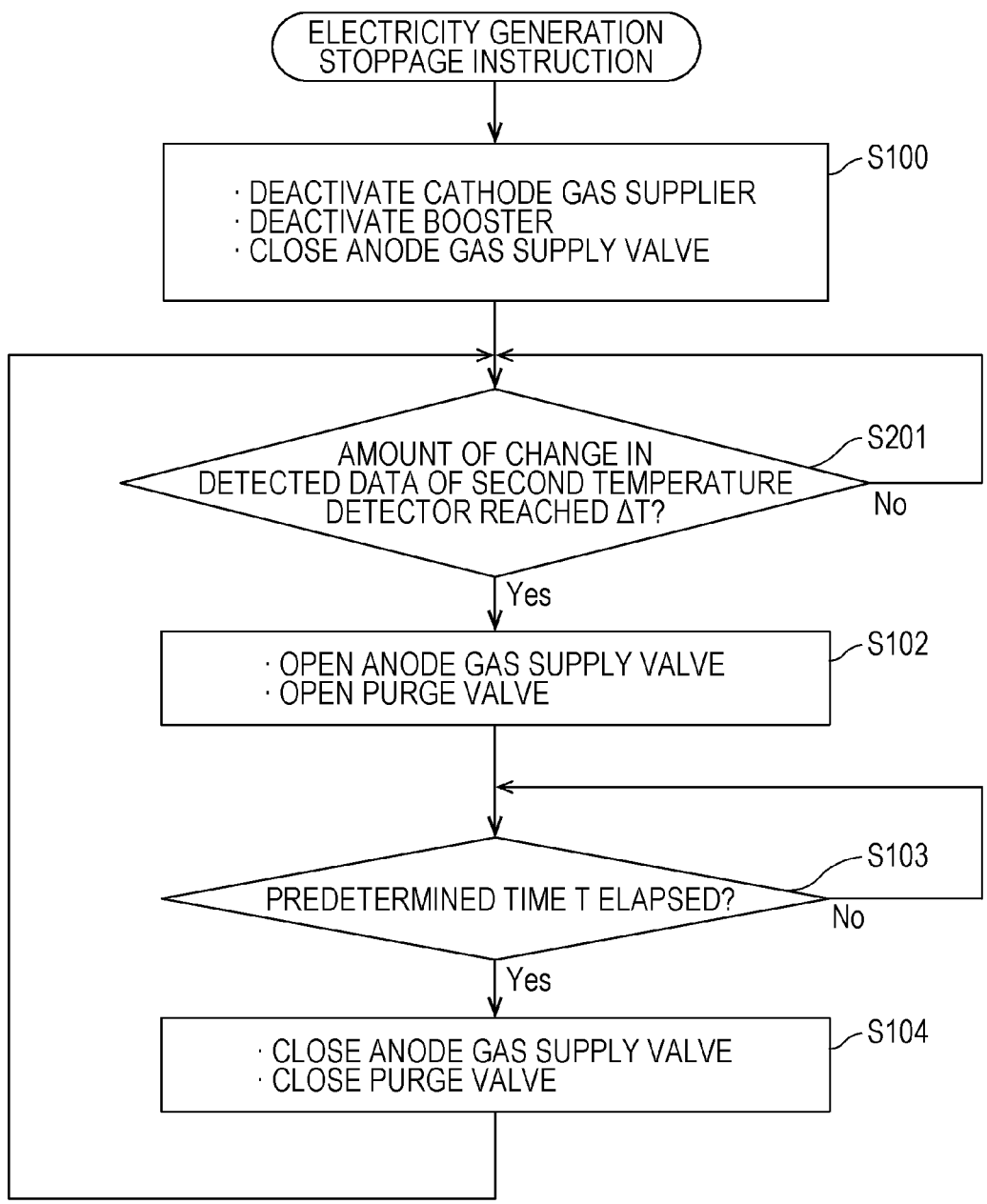
FIG. 4 is a flow chart showing an example of operation of the fuel cell system according to the first modification of the embodiment.

FIG. 4 is a flow chart showing an example of operation of the fuel cell system according to the first modification of the embodiment.

Steps S100, S102, S103, and S104 of FIG. 4 are the same as steps S100, S102, S103, and S104 of FIG. 2 and, as such, are not described here.

In step S201, a determination is made as to whether the amount of change in the detected data of the second temperature detector 22 has reached the predetermined value ΔT.

In a case where the amount of change in the detected data of the second temperature detector 22 has not reached the predetermined value ΔT (i.e. in the case of "No" in step S201), the status quo is maintained.

In a case where the amount of change in the detected data of the second temperature detector 22 has reached the predetermined value ΔT (i.e. in the case of "Yes" in step S201), the process proceed to next step S102.

In this way, the gas purging, in which at least a part of the cathode off-gas emission path 13 is purged, is performed on the basis of the amount of change in the detected data of the second temperature detector 22.

Thus, since it is possible to predict an amount of shrinkage of the gas in the cathode off-gas emission path 13 on the basis of the amount of change in the detected data of the second temperature detector 22, the amount of outside air that flows into the cathode off-gas emission path 13 can be appropriately estimated from the amount of shrinkage.

This makes it possible to perform the gas purging at an appropriate time when the amount of outside air that flows into the cathode off-gas emission path 13 has reached a predetermined level, thus making it possible to send the hydrogen-containing gas in an appropriate amount corresponding to the amount of outside air that flows into the cathode off-gas emission path 13. Further, the size of the pipe that constitutes the cathode off-gas emission path 13 can be appropriately designed in accordance with the amount of outside air that flows into the cathode off-gas emission path 13.

The fuel cell system 100 according to the present modification may be the same as the fuel cell system 100 according to the embodiment except for the features described above.

Second Modification

A fuel cell system 100 according to the present modification is the fuel cell system 100 according to any of the first to third aspects, further including a pressure detector 23 that detects a gas pressure of at least either the cathode gas flow channel 10 or the cathode off-gas emission path 13 of the fuel cell 1, wherein the gas purging is performed on the basis of an amount of change in detected data of the pressure detector 23.

Figure 5:
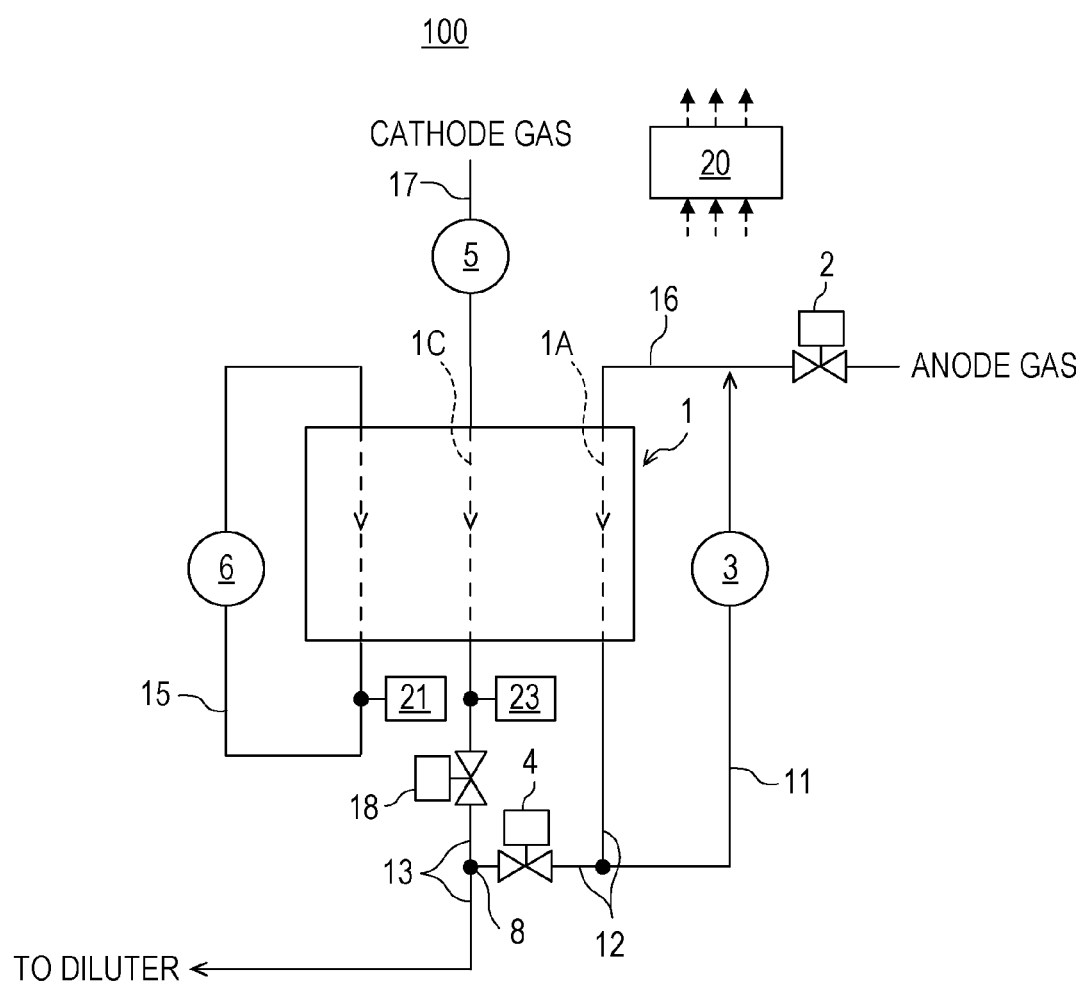
FIG. 5 is a diagram showing an example of a fuel cell system according to a second modification of the embodiment.

FIG. 5 is a diagram showing an example of a fuel cell system according to a second modification of the embodiment.

In the example shown in FIG. 5, the fuel cell system 100 includes a fuel cell 1, an anode gas supply valve 2, a booster 3, a purge valve 4, a cathode gas supplier 5, a cooling water circulator 6, a recycle gas path 11, an anode off-gas emission path 12, a cathode off-gas emission path 13, a cooling water circulatory path 15, an anode gas supply path 16, a cathode gas supply path 17, a controller 20, a first temperature detector 21, a pressure detector 23, and a gas interrupter 18.

The fuel cell 1, the anode gas supply valve 2, the booster 3, the purge valve 4, the cathode gas supplier 5, the cooling water circulator 6, the recycle gas path 11, the anode off-gas emission path 12, the cathode off-gas emission path 13, the cooling water circulatory path 15, the anode gas supply path 16, the cathode gas supply path 17, and the first temperature detector 21 are the same as those of the embodiment and, as such, are not described here.

As mentioned above, the pressure detector 23 detects the gas pressure of at least either the cathode gas flow channel 10 or the cathode off-gas emission path 13 of the fuel cell 1. The pressure detector 23 may be of any configuration, provided it can directly or indirectly detect such a gas pressure. In the fuel cell system 100 according to the present modification, the pressure detector 23 is disposed on the cathode off-gas emission path 13 near the outlet of the cathode gas flow channel 10 of the fuel cell 1. This allows the gas pressure of the cathode off-gas emission path 13 of the fuel cell 1 to be directly detected by the pressure detector 23. Possible examples of the pressure detector 23 include a differential manometer that measures a pressure difference from atmospheric pressure and the like.

The gas interrupter 18 interrupts the cathode off-gas emission path 13. The gas interrupter 18 is disposed on a part of the cathode off-gas emission path 13 located downstream of the pressure detector 23 and upstream of the junction 8. The gas interrupter 18 may be of any configuration, provided it can interrupt such a place on the cathode off-gas emission path 13. Possible examples of the gas interrupter 18 include an electromagnetic on-off valve and the like.

During generation of electricity by the fuel cell 1, the interruption of the cathode off-gas emission path 13 by the gas interrupter 18 is released. This causes the cathode gas to be supplied to the cathode gas flow channel 10 of the fuel cell 1 and causes the cathode off-gas that was not used for the generation of electricity by the fuel cell 1 to be released to the outside through the cathode off-gas emission path 13.

Meanwhile, after stoppage of generation of electricity by the fuel cell 1, the cathode off-gas emission path 13 is interrupted by the gas interrupter 18. This causes the cathode gas flow channel 10 of the fuel cell 1 to be sealed. At this point in time, since a drop in temperature of the fuel cell 1 causes the pressure in the cathode gas flow channel 10 to be made negative by steam condensation of the cathode gas flow channel 10, an operation for returning the internal pressure of the cathode gas flow channel 10 to atmospheric pressure needs to be performed by temporarily releasing the interruption of the cathode off-gas emission path 13 by the gas interrupter 18.

The controller 20 may control targets of control such as the anode gas supply valve 2, the purge valve 4, and the gas interrupter 18 on the basis of the amount of change in the detected data of the pressure detector 23 in executing the gas purging.

Figure 6:
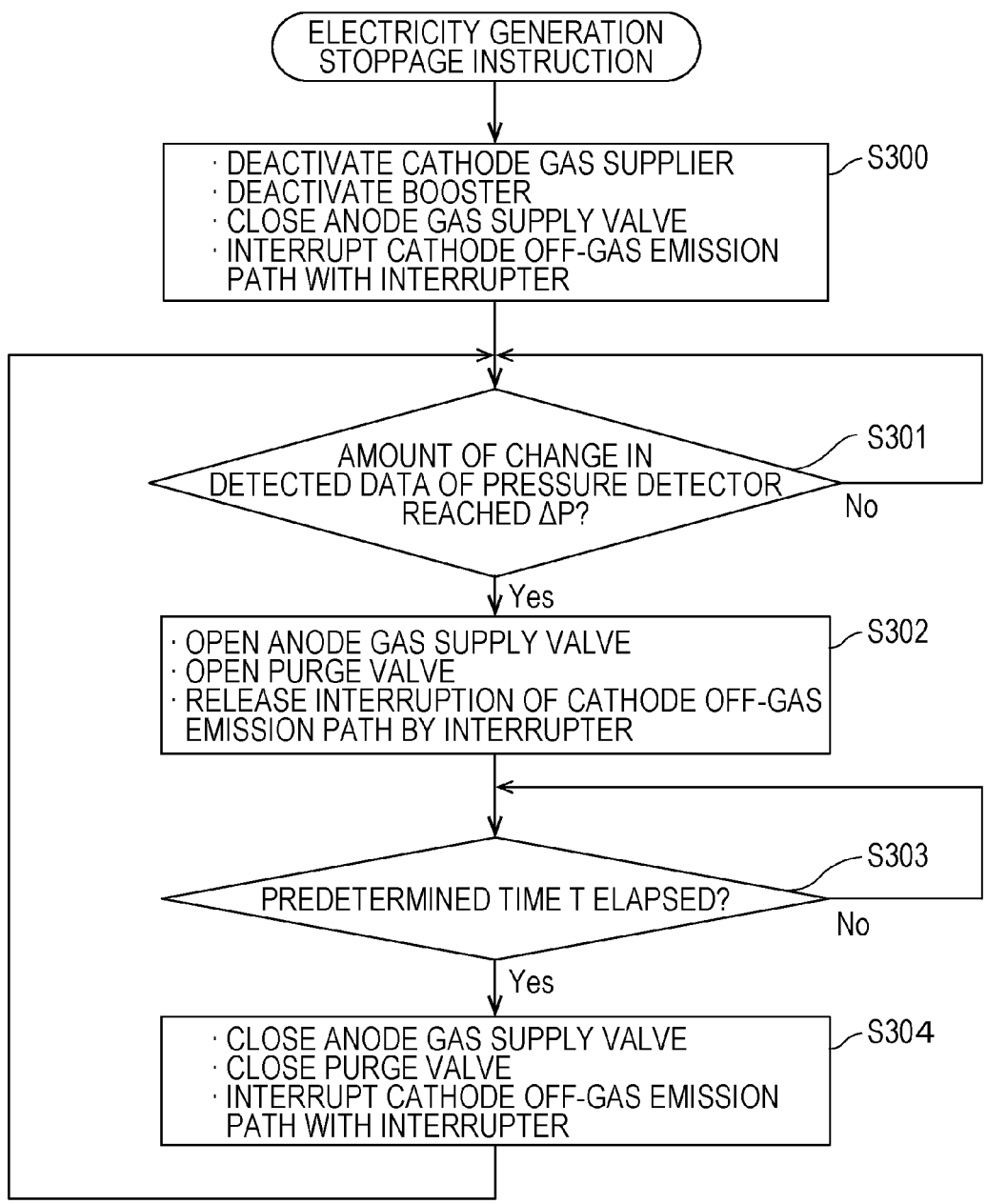
FIG. 6 is a flow chart showing an example of operation of the fuel cell system according to the second modification of the embodiment.

FIG. 6 is a flow chart showing an example of operation of the fuel cell system according to the second modification of the embodiment.

First, in step S300, the cathode gas supplier 5 and the booster 3 are deactivated and the anode gas supply valve 2 is closed. Further, the cathode off-gas emission path 13 is interrupted by the gas interrupter 18. This stops the supply of the cathode gas to the cathode gas flow channel 10 of the fuel cell 1 and the supply of the anode gas to the anode gas flow channel 1A of the fuel cell 1. At this point in time, the cooling of the fuel cell 1 by the cooling water in the cooling water circulatory path 15 continues, as the cooling water circulator 6 is operating.

Next, in step S301, a determination is made as to whether the amount of change in the detected data of the pressure detector 23 has reached a predetermined value ΔP. That is, since the cathode off-gas emission path 13 is interrupted by the gas interrupter 18, a drop in temperature of the fuel cell 1 causes the pressure in the cathode gas flow channel 10 to be made negative by steam condensation of the cathode gas flow channel 10. This makes it possible to check a pressure condition in the cathode gas flow channel 10 according to the amount of change in the detected data of the pressure detector 23.

In a case where the amount of change in the detected data of the pressure detector 23 has not reached the predetermined value ΔP (i.e. in the case of "No" in step S301), the status quo is maintained.

In a case where the amount of change in the detected data of the pressure detector 23 has reached the predetermined value ΔP (i.e. in the case of "Yes" in step S301), the process proceed to next step S302, in which the anode gas supply valve 2 and the purge valve 4 are opened. Further, the interruption of the cathode off-gas emission path 13 by the gas interrupter 18 is released. The release of the interruption of the cathode off-gas emission path 13 by the gas interrupter 18 allows the internal pressure of the cathode gas flow channel 10 to return to atmospheric pressure. Opening the anode gas supply valve 2 and the purge valve 4 causes a part of the cathode off-gas emission path 13 located downstream of the junction 8, where the anode off-gas emission path 12 and the cathode off-gas emission path 13 meet each other, to be purged with the hydrogen-containing gas having passed through the junction 8. Specifically, immediately after the start of the first gas purging after stoppage of generation of electricity by the fuel cell 1, the anode off-gas that stays in the anode off-gas emission path 12 is sent as the hydrogen-containing gas to the cathode off-gas emission path 13, and after that, the anode gas is sent as the hydrogen-containing gas to the cathode off-gas emission path 13.

In this way, the gas purging, in which at least a part of the cathode off-gas emission path 13 is purged, is performed on the basis of the amount of change in the detected data of the pressure detector 23.

It should be noted that the booster 3 may be activated in step S302. Activating the booster 3 allows the anode off-gas of the recycle gas path 11 and the anode gas of the anode gas supply path 16 to be smoothly supplied to the anode off-gas emission path 12 during the gas purging.

Next, in step S303, a determination is made as to whether the gas purging of step S302 has continued for the predetermined time T.

In a case where the gas purging of step S302 has not continued for the predetermined time T (i.e. in the case of "No" in step S303), the status quo is maintained.

In a case where the gas purging of step S302 has continued for the predetermined time T (i.e. in the case of "Yes" in step S303), the process proceeds to next step S304, in which the anode gas supply valve 2 and the purge valve 4 are closed. Further, the cathode off-gas emission path 13 is interrupted by the gas interrupter 18. It should be noted that in a case where the booster 3 was activated in step S302, the booster 3 is deactivated in step S304.

After that, the amount of change in the detected data of the pressure detector 23 is initialized, and the operation from step S301 onward is performed again.

Thus, since it is possible to predict an amount of shrinkage of the gas in the cathode off-gas emission path 13 on the basis of the amount of change in the detected data of the pressure detector 23, the amount of outside air that flows into the cathode off-gas emission path 13 can be appropriately estimated from the amount of shrinkage.

This makes it possible to perform the gas purging at an appropriate time when the amount of outside air that flows into the cathode off-gas emission path 13 has reached a predetermined level, thus making it possible to send the hydrogen-containing gas in an appropriate amount corresponding to the amount of outside air that flows into the cathode off-gas emission path 13. Further, the size of the pipe that constitutes the cathode off-gas emission path 13 can be appropriately designed in accordance with the amount of outside air that flows into the cathode off-gas emission path 13.

The fuel cell system 100 according to the present modification may be the same as the fuel cell system 100 according to the embodiment except for the features described above.

First Example

A fuel cell system 100 according to the present example is the fuel cell system according to any of the first to third aspects and the first and second modifications of the embodiment, wherein in a case where gravity acts from top down, the junction 8, where the anode off-gas emission path 12 and the cathode off-gas emission path 13 meet each other, is provided below the fuel cell 1.

Figure 7:
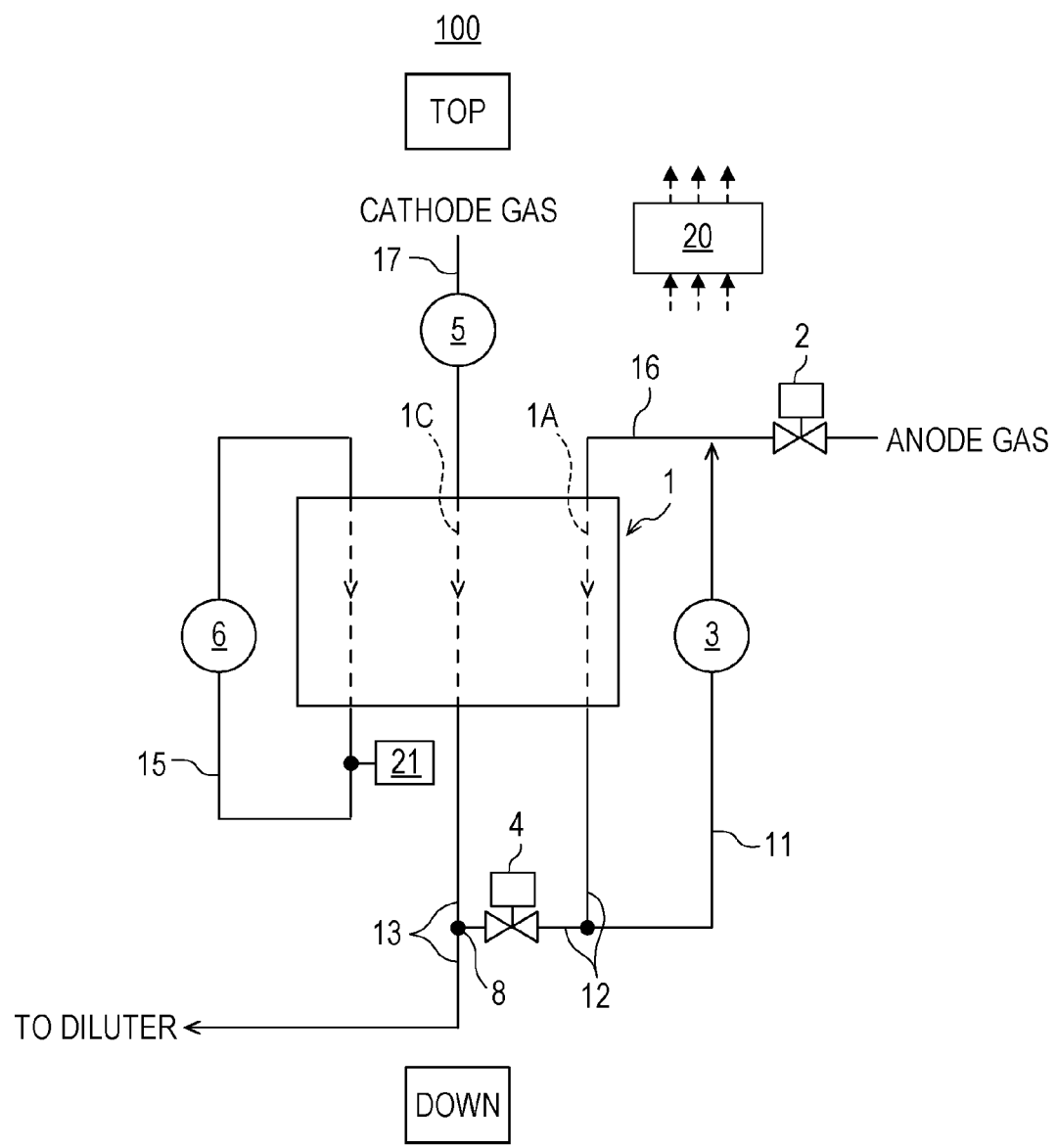
FIG. 7 is a diagram showing an example of a fuel cell system according to a first example of the embodiment.

FIG. 7 is a diagram showing an example of a fuel cell system according to a first example of the embodiment. FIG. 7 bears the legends "top" and "down" and assumes that gravity acts from "top" to "down".

Details of an apparatus configuration of the fuel cell system 100 according to the present example are the same as those of the embodiment, except that the direction that gravity acts in the fuel cell system 100 is specified, and, as such, are not described here.

Note here that the hydrogen-containing gas having passed through the junction 8, where the anode off-gas emission path 12 and the cathode off-gas emission path 13 meet each other, has a higher specific gravity than air and therefore diffuses upward in the cathode off-gas emission path 13. Therefore, providing the junction 8 below the fuel cell 1 makes it easy to cause the hydrogen-containing gas having passed through the junction 8 to diffuse into the cathode gas flow channel 10 of the fuel cell 1 during the gas purging.

Thus, the concentration of hydrogen in the cathode gas flow channel 10 of the fuel cell 1 during the gas purging can be kept higher than in a case where the junction 8 is provided above the fuel cell 1. Then, an increase in the amount of oxygen in the gas in the cathode gas flow channel 10 of the fuel cell 1 can be appropriately suppressed even if outside air flows into the cathode off-gas emission path 13 of the fuel cell 1.

The fuel cell system 100 according to the present example may be the same as the fuel cell system 100 according to any of the embodiment and the first and second modifications of the embodiment except for the features described above.

Second Example

A fuel cell system 100 according to the present example is the fuel cell system according to any of the first to third aspects, the first and second modifications of the embodiment, and the first example of the embodiment, wherein in a case where gravity acts from top down, the junction 8, where the anode off-gas emission path 12 and the cathode off-gas emission path 13 meet each other, is provided in a downward-sloping portion that extends from upstream to downstream of the cathode off-gas emission path 13.

Details of an apparatus configuration of the fuel cell system 100 according to the present example are the same as those of the embodiment and, as such, are not described here.

The hydrogen-containing gas having passed through the junction 8, where the anode off-gas emission path 12 and the cathode off-gas emission path 13 meet each other, has a higher specific gravity than air and therefore diffuses upward in the cathode off-gas emission path 13. Therefore, providing the junction 8 in the downward-sloping portion that extends from upstream to downstream of the cathode off-gas emission path 13 makes it easy to cause the hydrogen-containing gas having passed through the junction 8 to diffuse into the cathode gas flow channel 10 of the fuel cell 1 during the gas purging.

Thus, the concentration of hydrogen in the cathode gas flow channel 10 of the fuel cell 1 during the gas purging can be kept higher than in a case where the junction 8 is provided in an upward-sloping portion that extends from upstream to downstream of the cathode off-gas emission path 13. Then, an increase in the amount of oxygen in the gas in the cathode gas flow channel 10 of the fuel cell 1 can be appropriately suppressed even if outside air flows into the cathode off-gas emission path 13 of the fuel cell 1.

The fuel cell system 100 according to the present example may be the same as the fuel cell system 100 according to any of the embodiment, the first and second modifications of the embodiment, and the first example of the embodiment except for the features described above.

Third Example

A fuel cell system 100 according to the present example is the fuel cell system according to any of the first to third aspects, the first and second modifications of the embodiment, and the first and second examples of the embodiment, further including a diluter 30 that dilutes, with air, the hydrogen-containing gas that flows through the cathode off-gas emission path 13, wherein the controller 20 activates the diluter 30 during the gas purging.

Figure 8:
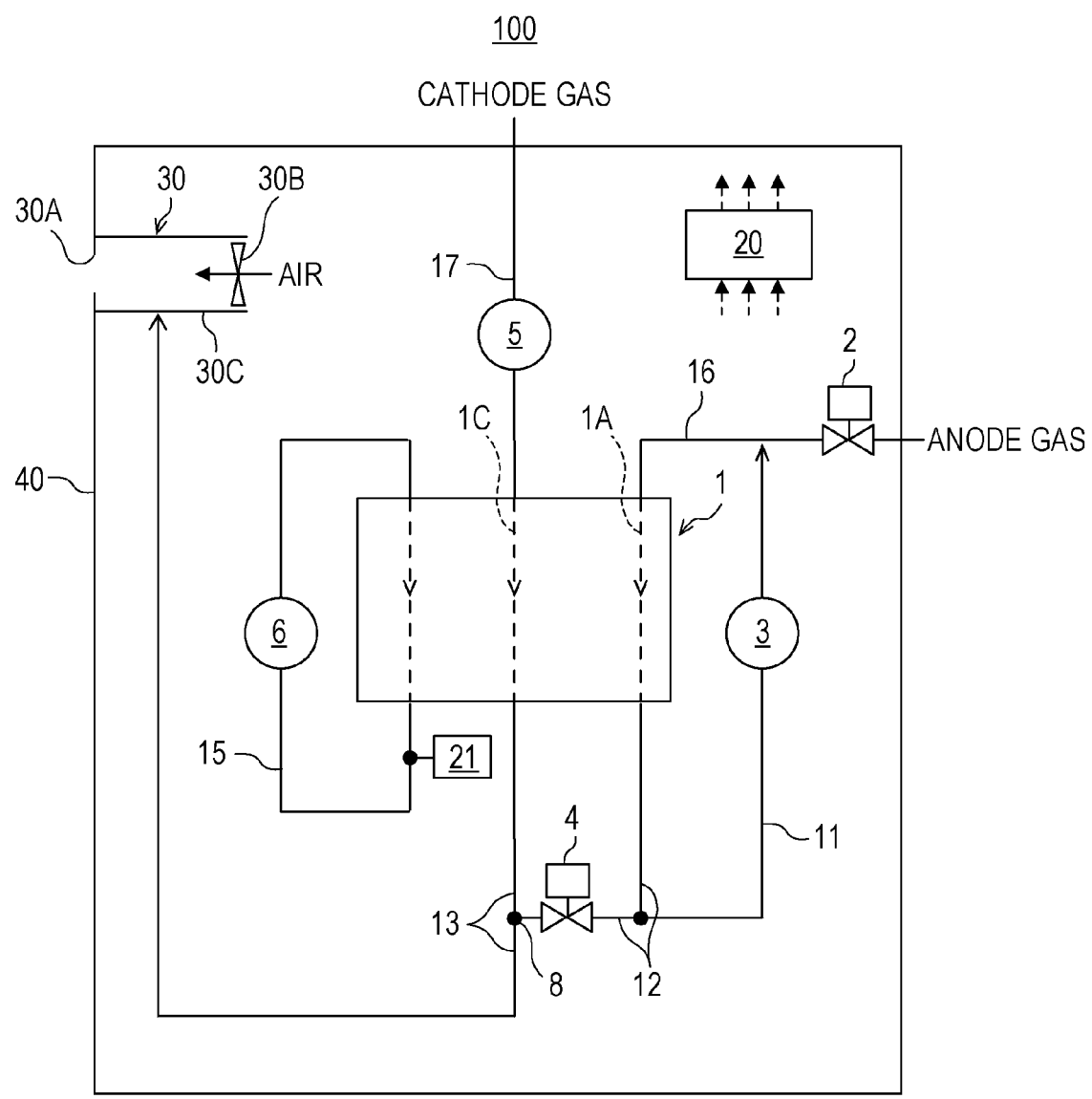
FIG. 8 is a diagram showing an example of a fuel cell system according to a third example of the embodiment.

FIG. 8 is a diagram showing an example of a fuel cell system according to a third example of the embodiment.

In the example shown in FIG. 8, the fuel cell system 100 includes a fuel cell 1, an anode gas supply valve 2, a booster 3, a purge valve 4, a cathode gas supplier 5, a cooling water circulator 6, a recycle gas path 11, an anode off-gas emission path 12, a cathode off-gas emission path 13, a cooling water circulatory path 15, an anode gas supply path 16, a cathode gas supply path 17, a controller 20, a first temperature detector 21, and a diluter 30.

The fuel cell 1, the anode gas supply valve 2, the booster 3, the purge valve 4, the cathode gas supplier 5, the cooling water circulator 6, the recycle gas path 11, the anode off-gas emission path 12, the cathode off-gas emission path 13, the cooling water circulatory path 15, the anode gas supply path 16, the cathode gas supply path 17, and the first temperature detector 21 are the same as those of the embodiment and, as such, are not described here.

As mentioned above, the diluter 30 dilutes, with air, the hydrogen-containing gas that flows through the cathode off-gas emission path 13. The diluter 30 may be of any configuration, provided it can dilute, with air, the hydrogen-containing gas that flows through the cathode off-gas emission path 13. In the fuel cell system 1 according to the present embodiment, a ventilator 30 that ventilates the inside of a housing 40 of the fuel cell system 100 is used as the diluter 30.

Specifically, as shown in FIG. 8, the ventilator 30 includes an exhaust port 30A, an axial-flow fan 30B, and a hood 30C. The pipe that constitutes the cathode off-gas emission path 13 communicates with the inside of the hood 30C of the ventilator 30. The exhaust port 30A is formed in a wall of the housing 40. The axial-flow fan 30B is covered with the hood 30 in the housing 40 and provided in contraposition to the exhaust port 30A.

During generation of electricity by the fuel cell 1, the controller 20 activates the ventilator 30 at least in sending the anode off-gas containing the impurity gas such as the nitrogen gas to the cathode off-gas emission path 13.

With this, when the anode off-gas containing the impurity gas is supplied to the ventilator 30 through the cathode off-gas emission path 13, the concentration of hydrogen in the anode off-gas having flowed into the hood 30C from the cathode off-gas emission path 13 is reduced to a predetermined concentration or lower by the air from the ventilator 30. After that, the anode off-gas is released into the atmosphere through the exhaust port 30A.

After stoppage of generation of electricity by the fuel cell 1, the controller 20 activates the diluter 30 during the gas purging.

With this, when the hydrogen-containing gas used for the gas purging is supplied to the ventilator 30 through the cathode off-gas emission path 13, the concentration of hydrogen in the hydrogen-containing gas is reduced to a predetermined concentration or lower by the air from the ventilator 30. After that, the hydrogen-containing gas is released into the atmosphere through the exhaust port 30A.

The fuel cell system 100 according to the present example may be the same as the fuel cell system 100 according to any of the embodiment, the first and second modifications of the embodiment, and the first and second examples of the embodiment except for the features described above.

It should be noted that the embodiment, the first and second modifications of the embodiment, and the first to third examples of the embodiment may be combined with each other, unless they are mutually exclusive.

The following is another expression of the fuel cell system in the present disclosure. A fuel cell system according to a present disclosure includes: a fuel cell including an anode gas flow channel and a cathode gas flow channel, the fuel cell generating electricity from a hydrogen-containing anode gas flowing through the anode gas flow channel and an oxygen-containing cathode gas flowing through the cathode gas flow channel; an anode off-gas emission path through which an anode off-gas emitted from the anode gas flow channel of the fuel cell flows; a cathode off-gas emission path through which a cathode off-gas emitted from the cathode gas flow channel of the fuel cell flows; a purge valve is provided in the anode off-gas emission path between the fuel cell and a junction, the anode off-gas emission path being connected to the cathode off-gas emission path at the junction; and a controller, wherein after generation of electricity by the fuel cell is stopped, the controller opens the purge valve to perform a gas purging in which at least a part of the cathode off-gas emission path is purged with a hydrogen-containing gas having passed through the junction, and the hydrogen-containing gas contains at least either the anode gas or the anode off-gas.

The following is further another expression of the fuel cell system in the present disclosure. A fuel cell system according to further another expression the present disclosure includes: a fuel cell including an anode gas flow channel and a cathode gas flow channel, the fuel cell generating electricity from a hydrogen-containing anode gas supplied to the anode gas flow channel and an oxygen-containing cathode gas supplied to the cathode gas flow channel; an anode off-gas emission path through which an anode off-gas emitted from the anode gas flow channel of the fuel cell flows; a cathode off-gas emission path through which a cathode off-gas emitted from the cathode gas flow channel of the fuel cell flows; a purge valve that is provided in the anode off-gas emission path between the fuel cell and a junction, the anode off-gas emission path being connected to the cathode off-gas emission path at the junction; an anode gas supply path through which the anode gas that is supplied to the anode gas flow channel of the fuel cell flows; and an anode gas supplier provided in the anode gas supply path for supplying the anode gas to the anode gas supply path, wherein after the generation of the electricity by the fuel cell is stopped, the controller opens the purge valve and controls the anode gas supplier to supply the anode gas to the anode gas supply path, thereby performing a gas purging in which at least a part of the cathode off-gas emission path is purged with a hydrogen-containing gas having passed through the junction, and the hydrogen-containing gas contains at least either the anode gas or the anode off-gas.

The following is further another expression of the fuel cell system in the present disclosure. A fuel cell system according to further another expression the present disclosure includes: a fuel cell including an anode gas flow channel and a cathode gas flow channel, the fuel cell generating electricity from a hydrogen-containing anode gas supplied to the anode gas flow channel and an oxygen-containing cathode gas supplied to the cathode gas flow channel; an anode off-gas emission path through which an anode off-gas emitted from the anode gas flow channel of the fuel cell flows; a cathode off-gas emission path through which a cathode off-gas emitted from the cathode gas flow channel of the fuel cell flows; a purge valve that is provided in the anode off-gas emission path between the fuel cell and a junction, the anode off-gas emission path being connected to the cathode off-gas emission path at the junction; an anode gas supply path through which the anode gas that is supplied to the anode gas flow channel of the fuel cell flows; an anode gas supplier provided in the anode gas supply path for supplying the anode gas to the anode gas supply path; a cathode gas supply path through which the cathode gas that is supplied to the cathode gas flow channel of the fuel cell flows; a cathode gas supplier provided in the cathode gas supply path for supplying the cathode gas to the cathode gas supply path; and a controller, wherein the controller controls the anode gas supplier to stop supplying the anode gas to the anode gas supply path and controls the cathode gas supplier to stop supplying the cathode gas to the cathode gas supply path, thereby stopping generation of electricity by the fuel cell, and after the generation of the electricity by the fuel cell is stopped, the controller opens the purge valve and controls the anode gas supplier to supply the anode gas to the anode gas supply path, thereby performing a gas purging in which at least a part of the cathode off-gas emission path is purged with a hydrogen-containing gas having passed through the junction, and the hydrogen-containing gas contains at least either the anode gas or the anode off-gas.

From the foregoing description, many improvements and other embodiments are apparent to persons skilled in the art. Therefore, the foregoing description should be construed solely as exemplification and is one provided for the purpose of teaching persons skilled in the art the best mode of carrying out the present disclosure. Details of the structure and/or function of the present disclosure can be substantially modified without departing from the spirit of the present disclosure.

A fuel cell system according to an aspect of the present disclosure makes it possible, even without changing the volume of a cathode off-gas sealing space, to reduce the amount of outside oxygen that flows into a fuel cell after stoppage of generation of electricity by the fuel cell. Therefore, an aspect of the present disclosure can be utilized, for example, in a fuel cell system.

What is claimed is:

1. A fuel cell system comprising:
    a fuel cell including an anode gas flow channel and a cathode gas flow channel, the fuel cell generating electricity from a hydrogen-containing anode gas flowing through the anode gas flow channel and an oxygen-containing cathode gas flowing through the cathode gas flow channel;
    an anode off-gas emission path through which an anode off-gas emitted from the anode gas flow channel of the fuel cell flows;
    a cathode off-gas emission path through which a cathode off-gas emitted from the cathode gas flow channel of the fuel cell flows; and
    a junction where the anode off-gas emission path and the cathode off-gas emission path meet each other;
    a purge valve that is provided in the anode off-gas emission path between the fuel cell and the junction;
    an anode gas supply path through which the anode gas that is supplied to the anode gas flow channel of the fuel cell flows;
    an anode gas supplier provided in the anode gas supply path for supplying the anode gas to the anode gas supply path;
    a cathode gas supply path through which the cathode gas that is supplied to the cathode gas flow channel of the fuel cell flows;
    a cathode gas supplier provided in the cathode gas supply path for supplying the cathode gas to the cathode gas supply path; and
    a controller including an MPU or a CPU programmed to, during a stoppage operation:
        control the anode gas supplier to stop supplying the anode gas to the anode gas supply path, and control the cathode gas supplier to stop supplying the cathode gas to the cathode gas supply path, thereby stopping generation of electricity by the fuel cell, and
        after the generation of the electricity by the fuel cell is stopped, open the purge valve and control the anode gas supplier to supply the anode gas to the anode gas supply path, thereby performing a gas purging in which at least a part of the cathode off-gas emission path is purged with a hydrogen-containing gas having passed through the junction, wherein:
    the hydrogen-containing gas contains at least either the anode gas or the anode off-gas, and
    the junction is located at a position of the cathode off-gas emission path before the cathode off-gas emission path is connected to a diluter.

2. The fuel cell system according to claim 1, further comprising:
    a recycle gas path that branches off from the anode off-gas emission path upstream of the purge valve and meets the anode gas supply path; and
    a booster provided in the recycle gas path,
    wherein the controller activates the booster during the gas purging.

3. The fuel cell system according to claim 1, further comprising a first temperature detector that detects a temperature of the fuel cell,
    wherein the gas purging is performed on the basis of an amount of change in detected data of the first temperature detector.

4. The fuel cell system according to claim 1, further comprising a second temperature detector that detects a gas temperature of at least either the cathode gas flow channel or the cathode off-gas emission path,
    wherein the gas purging is performed on the basis of an amount of change in detected data of the second temperature detector.

5. The fuel cell system according to claim 1, further comprising a pressure detector that detects a gas pressure of at least either the cathode gas flow channel or the cathode off-gas emission path,
    wherein the gas purging is performed on the basis of an amount of change in detected data of the pressure detector.

6. The fuel cell system according to claim 1, wherein in a case where gravity acts from top down, the junction is provided below the fuel cell.

7. The fuel cell system according to claim 1, wherein in a case where gravity acts from top down, the junction is provided in a downward-sloping portion that extends from upstream to downstream of the cathode off-gas emission path.

8. The fuel cell system according to claim 1, further comprising the diluter that dilutes, with air, the hydrogen-containing gas that flows through the cathode off-gas emission path,
    wherein the controller activates the diluter during the gas purging.

* * * * *